Charles E. Hemminger Inventor
by P. J. Whelan Attorney

United States Patent Office 2,707,701
Patented May 3, 1955

2,707,701

METHOD OF REGENERATING FOULED CATALYST PARTICLES EMPLOYED IN THE CONVERSION OF HYDROCARBONS

Charles E. Hemminger, Westfield, N. J., assignor to Esso Research and Engineering Company, a corporation of Delaware Application July 20, 1946, Serial No. 685,013, which is a division of application Serial No. 410,525, September 12, 1941. Divided and this application December 21, 1949, Serial No. 134,308

2 Claims. (Cl. 196—52)

This invention relates to treating vapors or gases with finely divided solid contacting material and more particularly relates to the catalytic conversion of hydrocarbons in which finely divided catalyst material is used.

According to my invention, vapors and/or gases are passed through a reaction zone or vessel in a direction countercurrent to the flow of finely divided contacting material. Preferably the vapors or gases are passed upwardly through the reaction zone and the finely divided solid contacting material is passed downwardly through the reaction zone. The velocity of the vapor or gas is so adjusted that the solid particles are fluidized and simulate a liquid.

According to the preferred form of my invention, the reaction zone or vessel is provided with contacting means whereby intimate contact between the solid particles and the vapors or gases is obtained.

Figure 1:
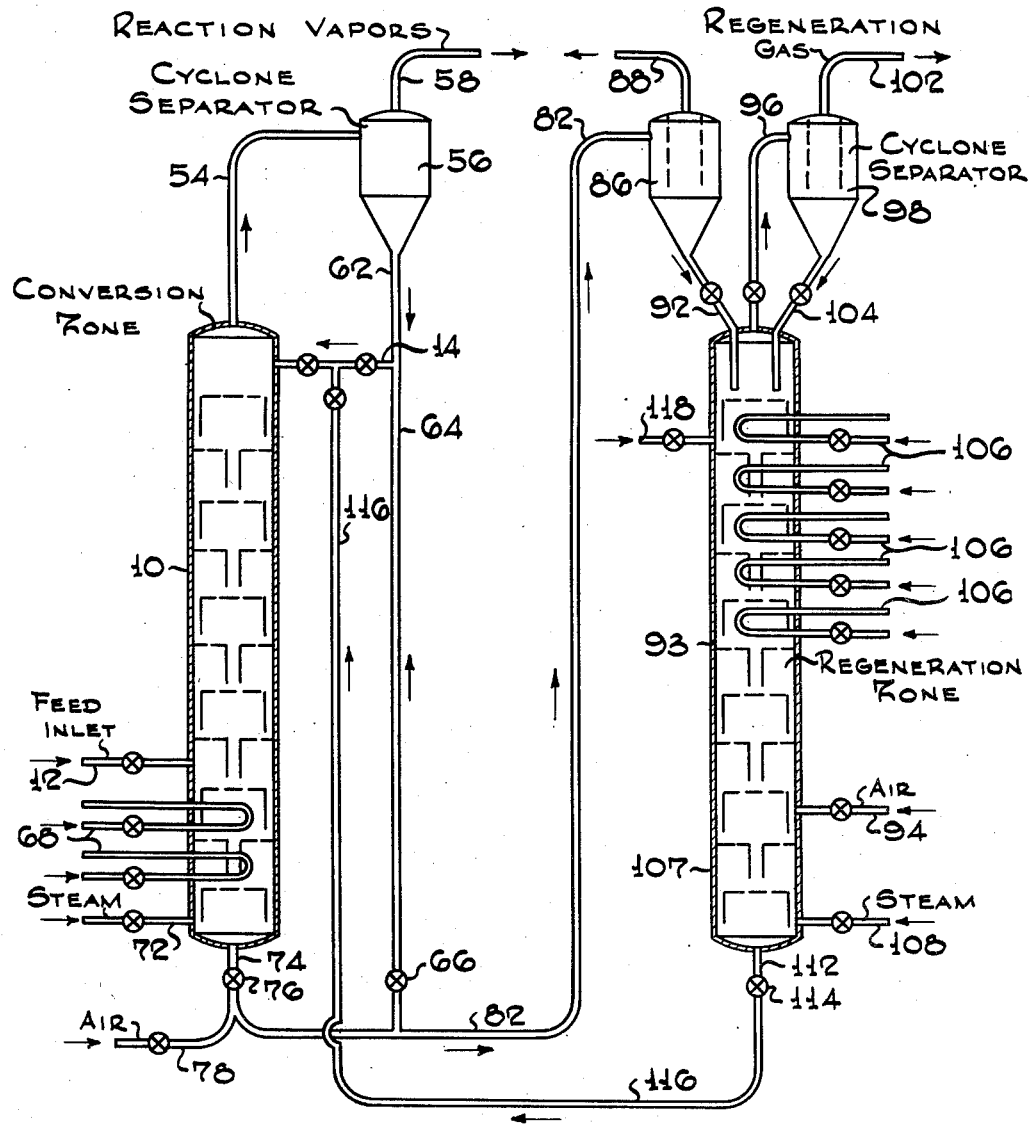
Fig. 1 represents a diagrammatic showing of apparatus adapted to carry out my invention.

Referring now to the drawing, the reference character 10 designates, a reaction zone or vessel wherein vapors and gases are contacted with finely divided solid material. The vapors or gases are introduced into the lower portion of the vessel through line 12. Finely divided solid contacting material is introduced into the upper portion of the vessel 10 through line 14. The contacting material may be fresh or may be regenerated. The flow of the finely divided material and vapors or gases is countercurrent in the vessel 10 and in order to effect intimate contact between the solids and the vapors or gases contacting means are arranged within the vessel 10.

Figure 2:
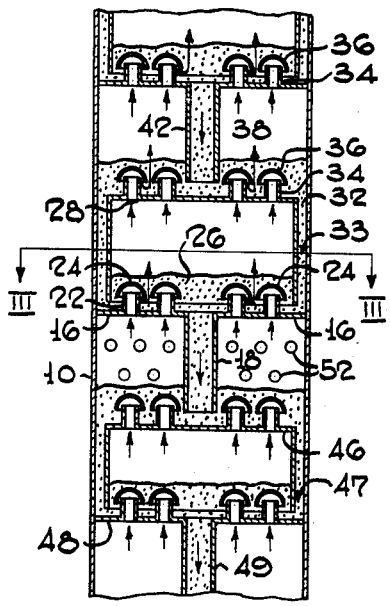
Figure 2 represents an enlarged detail showing the internal construction of one form of contacting means in a vessel.
Figure 3:
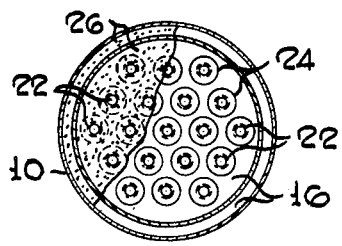
Figure 3 represents a horizontal cross-section taken substantially on line III—III of Figure 2.

As shown in the drawings, the reaction zone or vessel 10 comprises a bubble tray column. Instead of this construction the vessel 10 may be a packed tower consisting of an upright shell filled with loose pieces of solid material of uniform size thrown in at random, in the interstices of which the downflowing phase and upflowing vapors or gases are distributed. The vessel is so constructed to provide contact between the vapors and solid particles passing through the vessel 10. Attention is directed to Figure 2 which shows an enlarged detail of the vessel 10 and includes a plate 16 having a down spout 18 for conducting solid particles from the plate 16 to the plate beneath the plate 16. Extending upwardly from the plate 16 are small tubes 22 provided with caps 24 to provide passageways for the vapor or gas passing upwardly through the vessel 10. As before stated, the velocity of the vapors or gases is so adjusted that the solid particles are maintained in a fluidized condition. The solid particles in fluidized condition are shown at 26 on plate 16.

Arranged above the plate 16 is another plate 28 which is spaced from the walls of the vessel 10 as at 32 to provide passageways 33 for conducting the fluidized solid particles from the plate 28 to the plate 16 directly beneath the plate 28. The plate 28 is also provided with upwardly extending tubes 34 provided with caps 36 to provide passageways for the vapors or gases passing upwardly through the vessel 10 while at the same time preventing downward flow of the fluidized solid particles through the tubes 34. The solid particles in fluidized condition are shown at 38 on the plate 28. The fluidized solid particles are conducted to the plate 28 by means of a down spout 42 which conducts the fluidized solid particles from a plate directly above the plate 28.

Beneath the first mentioned plate 16 is another plate 46 which is similar in construction to the plate 28. Plate 46 is so arranged to have passageways 47 for conducting the fluidized solid particles from the plate 46 to the plate 48 which is arranged beneath the plate 46. Plate 48 is similar in construction to the first mentioned plate 16 and has a down spout 49 for conducting fluidized solid particles from the plate 48 to the plate directly beneath. Preferably the down spouts 42, 18 and 49 extend below the surface of the fluidized mass of the solid particles on the respective plates.

From the above it will be seen that the vapors or gases pass upwardly through the vessel 10 and the velocity of the vapors or gases is so adjusted that the solid particles are fluidized and flow like a liquid. The fluidized solid particles flow downwardly in the vessel 10 in countercurrent relation to the vapors or gases. For example, the upflowing vapors or gases pass through the bed 26 on plate 16 to maintain the solid particles in fluidized condtition. The fluidized solid particles flow from the plate 16 through the down spout 18 to the next lower plate 46. The vapors or gases pass upwardly through the bed of fluidized solid particles 26 and through tubes 34 arranged on plate 28 and then through the bed of solid particles 38 on the plate 28.

With the arrangement of contacting means above described, intimate contact between the vapors or gases and solid particles is effected and a greater degree of agitation is obtained than in vessels which do not have the contacting means. If desired, heating or cooling coils 52 may be introduced into the space between the plates. For example, in Figure 2 tubes 52 are shown arranged between plates 16 and 46.

In the catalytic conversion of hydrocarbons carbonaceous deposits are formed on the solid particles which are catalytic in this type of operation and it is usually necessary to regenerate the catalyst particles before re-using them in another conversion operation. In some instances the catalytic particles may be recycled to the conversion zone or vessel 10 without regeneration. The regeneration of the catalyst particles or solid particles will be hereinafter described in greater detail.

The reaction products in vapor form pass overhead through line 54. While the velocity of the vapors or gases through the vessel 10 is relatively low, the reaction products carry some of the solid particles overhead. It is desirable to remove these solid particles from the reaction products and the vapors passing through line 54 are introduced into a separating means 56 which may be any suitable separating means but which is shown in the drawing as a cyclone separator. More than one separating means may be used if desired. In the separating means 56, vapors and gases are separated from substantially dry solid particles. The reaction products in vapor form pass overhead through line 58 and are further treated as desired to separate desired constituents. In the catalytic conversion of hydrocarbons the reaction products in vapor form are preferably passed to a fractionating system where the desired motor fuels are separated from the rest of the reaction products.

The separated solid particles collecting in the separator 56 are withdrawn through line 62 and passed through line 64 having a valve 66 to a regeneration zone presently to be described. In some instances it may be desirable to recycle some of the separated solid particles to the reaction zone or vessel 10 by means of line 14.

The contaminated solid particles which move downward in the reaction zone or vessel 10 are preferably passed through a stripping section for removing residual reaction products. In the catalytic conversion of hydrocarbons residual hydrocarbons are removed from the catalyst particles in this section. If desired, heating coils 68 may be introduced between the plates in the lower section of the reaction zone or vessel 10. Steam or other suitable stripping gas is introduced into the bottom portion of the reaction vessel or zone 10 through line 72.

The stripped solid particles are withdrawn from the bottom of the reaction zone or vessel 10 through line 74 having a valve 76. Air or other suitable regenerating gas is introduced into line 74 below valve 76 by means of line 78 and the contaminated solid particles are carried in suspension through line 82 to a separating means 86 for separating the solid particles from gases. The separating means 86 is any suitable separator and is shown on the drawing as a cyclone separator. More than one cyclone separator may be used if desired. The separated gases pass overhead through line 88. The separated solid particles are withdrawn from the bottom of the separating means 86 and passed through line 92 into the top portion of a regeneration zone 93. The contaminated solid particles from the separator 56 which are passed through line 64 are preferably mixed with the solid particles withdrawn from the bottom of the reaction zone or vessel 10 and this mixture is introduced into the separating means 86 just described. Line 82 may pass directly into the top vessel 93, eliminating the recovery means 86. The air in line 82 is separated from entrained solids in separating means presently to be described.

Air or other suitable regenerating gas is introduced into the lower portion of the regeneration zone 93 through line 94. The regeneration zone 93 is of substantially the same construction as the reaction zone or vessel 10 above described. The regeneration zone 93 is provided with bubble caps and down spouts for providing intimate contact between the solid particles and the regenerating gas. The contaminated solid particles pass downwardly through the regeneration zone and regenerating gas passes upwardly in countercurrent relation thereto.

The regeneration gases leave the top of the regeneration zone through line 96 and as they carry a certain amount of solid particles with them, it is desirable to pass the regeneration gases through a separating means 98 to recover the solid particles. The separating means 98 may be any suitable construction and is shown in the drawing as a cyclone separator. More than one separating means may be used if desired. The regeneration gases pass overhead through line 102 and are removed from the system. The separated solid particles are withdrawn from the bottom of the separating means 98 and returned to the upper portion of the regeneration zone through line 104. If line 82 passes directly into the top of vessel 93 as above described, the air is separated from entrained solids in separating means 98.

The solid particles during regeneration in the regeneration zone 93 are maintained in a fluidized condition during their passage through the regeneration zone. Preferably the return pipes 92 and 104 extend below the level of the fluidized solid particles on the top plate in the regeneration zone 93.

In the catalytic conversion of hydrocarbons carbonaceous or organic material is deposited on the catalyst particles. These catalyst particles are regenerated by burning off the carbonaceous or organic deposits. The first part of the regeneration is most active and as the reaction is exothermic, it is desirable to prevent the temperature from rising too high during this portion of the regeneration. Most catalytic substances are injured by high temperatures and therefore it is necessary to control the temperature during regeneration. One way of controlling the temperature is to introduce cooling coils 106 between the upper plates in the regeneration zone 93. Any suitable heat exchange medium may be circulated through tubes 106.

Steam or other suitable stripping or purging gas is introduced into the bottom portion or purging zone 107 of the regeneration zone 93 through line 108 to remove residual oxygen or regenerating gas from the solid particles in the lower portion of the regeneration zone 93. The regenerated solid particles are withdrawn from the bottom of the regeneration zone 93 through line 112 having a valve 114. The regenerated solid particles are passed through line 116 and introduced into the upper portion of the conversion zone or vessel 10 through line 14.

Some of the solid particles are lost from the system by entrainment with the vapors and gases leaving the separating means and in order to maintain the amount of solid particles substantially constant in the system, fresh solid particles are preferably introduced into the upper portion of the regeneration zone 93 through line 118.

Figure 4:
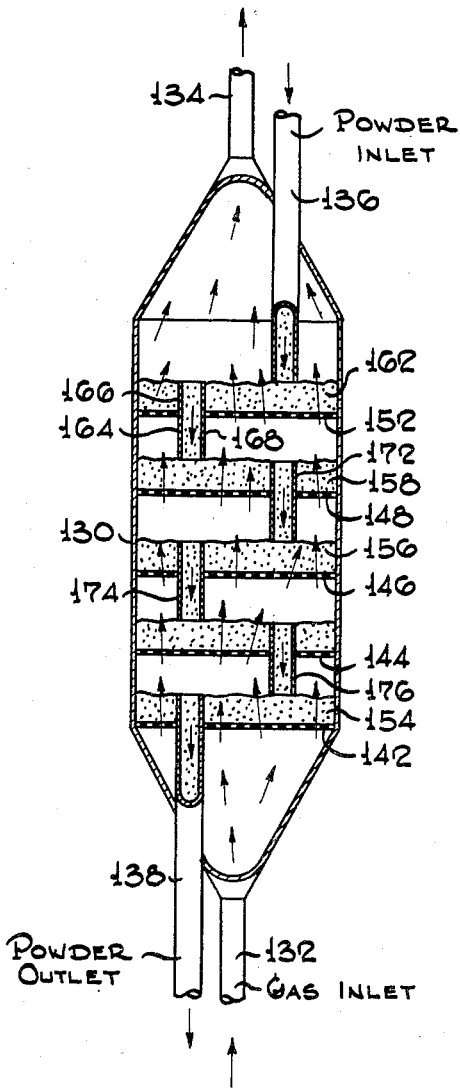
Figure 4 represents another form of reaction vessel.

In Figure 4 I have shown another form of apparatus which may be used to carry out my invention. The vessel 130 is provided with a gas or vapor inlet 132 at the bottom and a vapor or gas outlet 134 at the top. The vessel is also provided with an inlet pipe 136 extending into the top portion of the vessel for introducing powdered contacting or catalytic material. Near the bottom the vessel 130 is provided with a draw-off or outlet 138 for withdrawing powdered material which has passed downward through the vessel 130.

The vessel 130 is provided with a bottom distributing plate 142 which acts to distribute the incoming gas into the bottom portion of the vessel. The vessel 130 is also provided with spaced perforated plates 144, 146, 148 and 152 for supporting fluidized catalyst or solid particles and for distributing the upflowing gas or vapor through the fluidized catalyst or solid. The layers of fluidized catalyst or solid 154, 156, 158 and 162 are supported on the respective perforated plates 142, 144, 146, 148 and 152. The velocity of the vapor or gas passing upwardly through the vessel 130 aerates or fluidizes the layers of catalyst or solid particles on the perforated plates so that the catalyst or solid particles or fluidized mass flows like a liquid.

As powdered catalyst or solid material is continuously introduced onto the top plate 152 by means of the inlet pipe 136, the level of the fluidized mixtures rises and overflows a downflow pipe 164 which extends through the top perforated plate 152. The downflow pipe is arranged so that a portion 166 extends above the perforated plate 152 and another longer portion 168 extends below the perforated plate 152 to a level above the next lower perforated plate 148.

The fluidized solid particles flow down the pipe 164 onto the next lower perforated plate 148 until the mass reaches the level of the pipe 172 which carries the fluidized mixture to the next lower perforated plate 146. The downflow pipe 172 extends through the perforated plate 148 and has a portion projecting above the plate 148 and another portion projecting below the plate 148 described in connection with the first downflow pipe 164.

Another downflow pipe 174 is provided which extends through plate 146 and which permits downflow of the fluidized solid particles to the next lower perforated plate 144. Another downflow pipe 176 is provided which extends through the perforated plate 144 and conducts the fluidized solid particles to the bottom perforated plate or distribution plate 142. The outlet pipe 138 extends above the perforated plate 142 so that a layer of fluidized solid particles is built up on the plate and when it reaches the top of the outlet pipe 138, it flows out of the vessel 130.

In the treatment of gases or vapors the gases or vapors are introduced into the bottom of the vessel 130 and contact the solid particles on the separate perforated plates as the vapor or gas travels upward. The velocity of the vapor or gas is so controlled that the solid particles on the perforated plates are maintained in fluidized condition. The treated gas leaves the vessel 130 through line 134. In passing upward the vapor or gas passes countercurrent to the movement of the solid or catalyst particles.

The solid particles are maintained in the perforated plates and as the powdered material is introduced into the top of the vessel onto top plate 152, the fluidized mixture rises above the top 166 of the first downflow pipe 168 onto the next lower perforated plate 148 from which it passes through the succeeding downflow pipes and it is withdrawn from the vessel 130 through outlet 138.

The apparatus shown in Figure 4 may be used as either or both reaction vessels shown in Figure 1 of the drawing. While the apparatus may be used for the catalytic cracking of hydrocarbons, it is especially adapted for the regeneration of catalyst particles which have become coated with carbonaceous material. It will be seen that the catalyst particles containing the most carbonaceous material are introduced into the top of the vessel 130 where the upflowing gas has a low oxygen concentration. It is easiest to remove a large amount of the carbonaceous material in the first part of the regeneration and by limiting the amount of oxygen, the regeneration is controlled to prevent excessively high temperature.

When the catalyst particles arrive near the bottom of the vessel 130, most of the carbonaceous material has been burnt off and it is difficult to remove the remaining traces of carbonaceous material. The catalyst particles in the lower portion of the vessel 130 are contacted with gas containing a high oxygen concentration and the removal of the remaining carbonaceous material is facilitated.

In Figure 4 the bottom of each downflow pipe is about on a level with the top of the next lower downflow pipe. For example, the bottom of inlet pipe 136 is about on a level with the top 166 of downflow pipe 164. If desired the level of the fluidized solid particles on each perforated plate may be raised by using longer pipes and having the tops thereof extending above the bottoms of the draw-off pipes. For example, with the inlet pipe 136 as shown, a longer tube 164 may be used having its lower end positioned as shown whereas the upper portion 166 would extend above the position shown. In this way a thicker layer of fluidized solid particles would be obtained and the level of the layer would extend above the outlet end of inlet pipe 136. The remaining downflow pipes may be similarly arranged to increase the depth of the layer of fluidized particles on each plate.

In the catalytic cracking of hydrocarbons, gas oil vapors at a temperature of about 850° F. to 1000° F. are introduced into the reaction vessel or zone 10 through line 12. The catalyst particles at about the same temperature or as high as 1200° F. are introduced into the upper portion of the reaction zone 10 through line 14. The catalyst is in finely divided form and is of such a size that substantially all of the catalyst particles will pass through 50 to 400 mesh or finer of the standard series As a catalyst, any suitable catalytic material may be used such as acid activated bentonite clays, synthetic gels containing silica and alumina or silica and magnesia, etc.

During passage through the reaction zone or vessel 10, the oil vapors are intimately contacted with the catalyst particles and are converted to lower boiling hydrocarbons. The products of conversion pass overhead and are preferably passed through line 58 to a fractionating system for separating desired motor fuel from higher boiling constituents.

During the conversion, the catalyst particles become coated with carbonaceous material and as the catalyst particles pass into the stripping section of the vessel 10, residual volatile hydrocarbons are removed. The catalyst particles with the remaining carbonaceous deposits are introduced into the top portion of the regeneration zone. The catalyst particles are at a temperature of about 800° F. to 1000° F. In the regeneration zone the contaminated catalyst particles are intimately contacted with air and the carbonaceous material is burned from the catalyst particles. During regeneration of acid treated bentonite clays, the temperature is maintained below about 1200° F. to prevent injuring of the catalyst particles or sintering thereof. The regenerated catalyst particles pass through the stripping or purging zone 107 in the regeneration zone 93 and are then withdrawn from the bottom portion of the regeneration zone through line 112. The regenerated catalyst particles at a temperature of about 850° F. to 1200° F. are returned through lines 116 and 14 to the upper portion of the reaction zone or vessel 10 for another conversion operation.

One of the important features of the invention is the counterflow heat exchange of gases and solids which may be employed for heating or cooling either. For instance, in the regeneration in vessel 93 hot products of combustion at about 1100° F. deficient in oxygen heat the catalyst at about 900° F. and distill off residual hydrocarbons, decreasing the air requirements for regeneration. Then, in the top section the high carbon catalyst is burnt in the presence of low oxygen concentration air. In the bottom section the catalyst lean in carbon is burnt in the presence of gas high in oxygen concentration, almost pure air. Better temperature control of the surface of the catalyst during burning, better temperature distribution in the vessel and less time for burning results from having the high carbon catalyst burn in low oxygen concentration gas and low carbon catalyst burn in high oxygen concentration gas rather than a fixed concentration of either reactant in the vessel.

This is an example of the utility of counterflow powder and gas contact vessel where concentration gradients exist, the gradients being both positive and negative so that the mass action effect in the desired reaction is more or less even throughout the vessel. Such a phenomenon can be utilized in many reactions where gases react with or treat solids such as chlorination of solids, drying of solids, roasting of ores, partial oxidization or carbonization of coal, absorption of gases by solids, gas purification, production of iron carbonyl from iron oxide and carbon monoxide and the like.

The catalyst particles while passing through the reaction zone 10 and the regeneration zone 93 are maintained in a fluidized condition so that they flow like a liquid. In order to maintain the catalyst particles in fluidized condition, the velocity of the vapors passing upward in reaction zone 10 and the velocity of the gas or gases passing upwardly in regeneration zone 93 are about 0.5 to 3 feet per second. By having the contacting means within the vessels 10 and 93, better heat control of the interior of the reacting mass is possible. By adding or removing heat in the heat transfer tubes, any temperature gradients in the tower may be maintained. My process is also an improvement of other vessels which do not contain any contacting means in that channelling is avoided and better agitation and contact are obtained between the solid particles and the gases or vapors.

While two forms of vessel have been shown for the reaction and regeneration zones, it is to be understood that other forms of apparatus such as packed towers, disc and doughnut towers may be used to provide intimate contact between the solid particles, gases or vapors, etc., while maintaining the solid particles in fluidized condition so that they flow down through the tower or vessel as a fluidized mass. My invention is not to be restricted to the catalytic cracking of hydrocarbons and may be used for other catalytic reactions as for example the synthesis of hydrocarbons from carbon monoxide and hydrogen, hydrogenation, dehydrogenation, alkylation, isomerization, polymerization, etc.

The invention lends itself to flexibility in adding or removing gases or catalyst from any portion of the reaction vessel. For instance, catalyst may be added or removed from different plates, and, likewise, gases may be added or removed from each plate, the latter requiring catalyst separating means to return the catalyst to the vessel.

The invention is not to be restricted to the showing in the drawing and the details given in the description as various modifications and changes may be made without departing from the spirit of the invention.

This application is a division of U. S. Serial No. 685,013, filed July 20, 1946, now abandoned, which is a division of my parent application U. S. Serial No. 410,525, filed September 12, 1941, which is now U. S. Patent No. 2,444,990.

What is claimed is:

1. In a process for the catalytic conversion of hydrocarbon oils wherein solid conversion catalyst in finely divided form is continuously circulated in a closed circuit through a conversion zone and a regenerating zone in which combustible deposits are removed from said finely divided conversion catalyst, the improvement which comprises supplying spent finely divided conversion catalyst particles carrying inactivating residual hydrocarbons and carbonaceous deposits to the upper part of and passing them downwardly through a packed tower regenerating zone, supplying a stream of oxygen-containing regenerating gas to the lower portion of said regenerating zone in an amount sufficient to burn said carbonaceous deposits and to produce oxygen-deficient combustion gases at the top of said regeneration zone, maintaining an upwardly flowing body of said regenerating gas through said regenerating zone at a sufficient velocity to maintain the finely divided conversion catalyst in a dense, fluidized, liquid-simulating condition throughout the said regenerating zone, removing said oxygen-deficient combustion gases from the upper part of said regenerating zone, supplying a stream of inert stripping gas to the bottom portion of the regeneration zone below the regenerating gas inlet, and withdrawing hot, stripped regenerated conversion catalyst from the lower part of said regenerating zone.

2. A process according to claim 1 which specifically comprises the further step of recycling the withdrawn hot regenerated catalyst from the regeneration zone to a hydrocarbon conversion zone.

References Cited in the file of this patent

UNITED STATES PATENTS

| | | |
|---|---|---|
| 2,264,438 | Gaylor | Dec. 2, 1941 |
| 2,270,903 | Rudbach | Jan. 27, 1942 |
| 2,433,798 | Voorhees | Dec. 30, 1947 |
| 2,436,225 | Ogorzaly et al. | Feb. 17, 1948 |
| 2,443,673 | Atwell | June 22, 1948 |
| 2,444,990 | Hemminger | July 13, 1948 |
| 2,553,026 | Matheson | Dec. 5, 1950 |